United States Patent [19]
Simms et al.

[11] Patent Number: 6,112,261
[45] Date of Patent: Aug. 29, 2000

[54] DATA TRANSFERRING SYSTEM READING AND TEMPORARILY STORING A RECORD UNTIL A LENGTH OF THE RECORD IS DIFFERENT FROM A DEFINED RECORD LENGTH PARAMETER VALUE

[75] Inventors: Mark J. Simms, Boise; R. Alexis Takasugi, Eagle, both of Id.

[73] Assignee: Hewlett-Packard Company, Palo Alto, Calif.

[21] Appl. No.: 09/072,425

[22] Filed: May 4, 1998

[51] Int. Cl.[7] ................................. G06F 3/06
[52] U.S. Cl. .................... 710/35; 710/32; 710/33; 710/34; 710/52
[58] Field of Search .................... 710/20, 32, 35, 710/53, 33, 34, 52; 709/231; 712/223; 711/112; 360/48

[56] References Cited

U.S. PATENT DOCUMENTS

| | | | |
|---|---|---|---|
| 4,523,276 | 6/1985 | Maejima et al. | 364/200 |
| 4,556,951 | 12/1985 | Dickman et al. | 364/900 |
| 5,034,914 | 7/1991 | Osterlund | 710/52 |
| 5,210,851 | 5/1993 | Kato et al. | 395/425 |
| 5,274,508 | 12/1993 | Tan et al. | 360/48 |
| 5,335,328 | 8/1994 | Dunn et al. | 710/33 |
| 5,339,205 | 8/1994 | Sudoh et al. | 360/53 |
| 5,361,176 | 11/1994 | Schwartz et al. | 360/46 |
| 5,363,253 | 11/1994 | Nash et al. | 360/69 |
| 5,367,410 | 11/1994 | McCarthy | 360/48 |
| 5,377,056 | 12/1994 | Jones | 360/74.1 |
| 5,412,516 | 5/1995 | Kennedy et al. | 360/62 |
| 5,479,626 | 12/1995 | Bindloss et al. | 711/212 |
| 5,548,757 | 8/1996 | Matsuyama et al. | 707/200 |
| 5,586,280 | 12/1996 | Simms | 395/404 |
| 5,598,388 | 1/1997 | Van Maren et al. | 369/47 |
| 5,640,488 | 6/1997 | Junqua et al. | 704/245 |
| 5,713,023 | 1/1998 | Hayata et al. | 395/616 |
| 5,857,213 | 1/1999 | Benhase et al. | 711/112 |

FOREIGN PATENT DOCUMENTS 362031462A  2/1987  Japan ................................ 13/12

*Primary Examiner*—Thomas C. Lee
*Assistant Examiner*—Ilwoo Park

[57] ABSTRACT

Data transfer methods and systems are described. The methods and systems permit the transferring of data which is organized into a plurality of records from a readable data storage medium to a host system with reductions in overhead and processing complexity. In a preferred embodiment, the readable data storage medium comprises a tape drive and the records have variable lengths. A data transfer processor is provided and is operably configured for coupling between the host system and the tape drive. A first record length parameter value is defined and describes a length of at least one record which is to be transferred from the tape drive to the host system. A first record having a length corresponding to the first record length parameter value is read from the tape drive and into a temporary record-holding location. Reading of additional records from the tape drive continues until a record is read having a length which is different from the length of the first-defined record length parameter value. In one aspect, the reading of the records is discontinued and records stored in the temporary record-holding location having lengths corresponding to the record length parameter value are transferred to the host system. Reading of additional records from the tape drive can continue. In a preferred embodiment, the length of the first record which is read into the record-holding location is used to define the record length parameter value; and, after the transfer of all of such records, the record length parameter value can be redefined to comprise the length of the record having the different length. Reading can then continue of additional records having lengths corresponding to such redefined record length parameter value until a different length record is encountered. Processing can continue as described until a desired number of records are transferred to the host system.

20 Claims, 7 Drawing Sheets

DATA TRANSFERRING SYSTEM READING AND TEMPORARILY STORING A RECORD UNTIL A LENGTH OF THE RECORD IS DIFFERENT FROM A DEFINED RECORD LENGTH PARAMETER VALUE

FIELD OF THE INVENTION

The present invention relates to methods and systems for transferring data between a readable data storage medium and a host system. The invention relates particularly, but not exclusively, to data transfer methods and systems for transferring data organized into a plurality of records from a tape drive to a host system.

BACKGROUND OF THE INVENTION

It is generally known to store user data in the form of records on a data storage medium for purposes of backing up the user data. An exemplary system for storing and retrieving such user data is shown in FIG. 1 at 10 and generally includes a host system 12, a data transfer processor 14, and a data storage medium 16.

Host system 12 is generally a computer having a processor and memory which is capable of running an application program that enables data to be read from and written to data storage medium 16. Data transfer processor 14 is typically coupled between host system 12 and data storage medium 16 and organizes and controls the flow of data therebetween. Data transfer processor 14 can include memory which enables data which is retrieved from data storage medium 16 to be temporarily stored until such a time when it is appropriate to transfer the data to host system 12.

It is customary to effect the transfer of data from data storage medium 16 to host system 12 by placing not only the data content of individual records into a temporary memory location or data buffer in data transfer processor 14, but also additional information such as the individual lengths of each of the records transferred into the data transfer processor from data storage medium 16. Accordingly, this additional information has to be managed, stored, and processed whenever a data transfer is effected. Thus, the transfer of data is not as simple as merely retrieving stored data from data storage medium 16 and routing it to host system 12. Needless to say, management and organization of such information results in a large overhead in addition to processing complexities. It is desirable to reduce the overhead required to handle such information as well as the processing complexities involved therewith.

Exemplary data transfer methods and systems, and in particular those pertaining to tape drive systems are described in the following patents, the disclosures of which are incorporated by reference herein: U.S. Pat. Nos. 5,586,280, 5,210,851, 5,361,176, 5,377,056, 5,274,508, 5,367,410, 5,363,253, and 5,412,516.

This invention arose out of concerns associated with providing improved methods and systems for transferring data between data storage mediums and host systems, and in particular between tape drives and host systems.

SUMMARY OF THE INVENTION

Data transfer methods and systems are described. The methods and systems permit the transferring of data which is organized into a plurality of records from a readable data storage medium to a host system with reductions in overhead and processing complexity. In a preferred embodiment, the readable data storage medium comprises a tape drive and the records have variable lengths. A data transfer processor is provided and is operably configured for coupling between the host system and the tape drive. A first record length parameter value is defined and describes a length of at least one record which is to be transferred from the tape drive to the host system. A first record having a length corresponding to the first record length parameter value is read from the tape drive and into a temporary record-holding location. Reading of additional records from the tape drive continues until a record is read having a length which is different from the length of the first-defined record length parameter value. In one aspect, the reading of the records is discontinued and records stored in the temporary record-holding location having lengths corresponding to the record length parameter value are transferred to the host system. Reading of additional records from the tape drive can continue. In a preferred embodiment, the length of the first record which is read into the record-holding location is used to define the record length parameter value; and, after the transfer of all of such records, the record length parameter value can be redefined to comprise the length of the record having the different length. Reading can then continue of additional records having lengths corresponding to such redefined record length parameter value until a different length record is encountered. Processing can continue as described until a desired number of records are transferred to the host system.

DETAILED DESCRIPTION OF THE INVENTION

Figure 1:
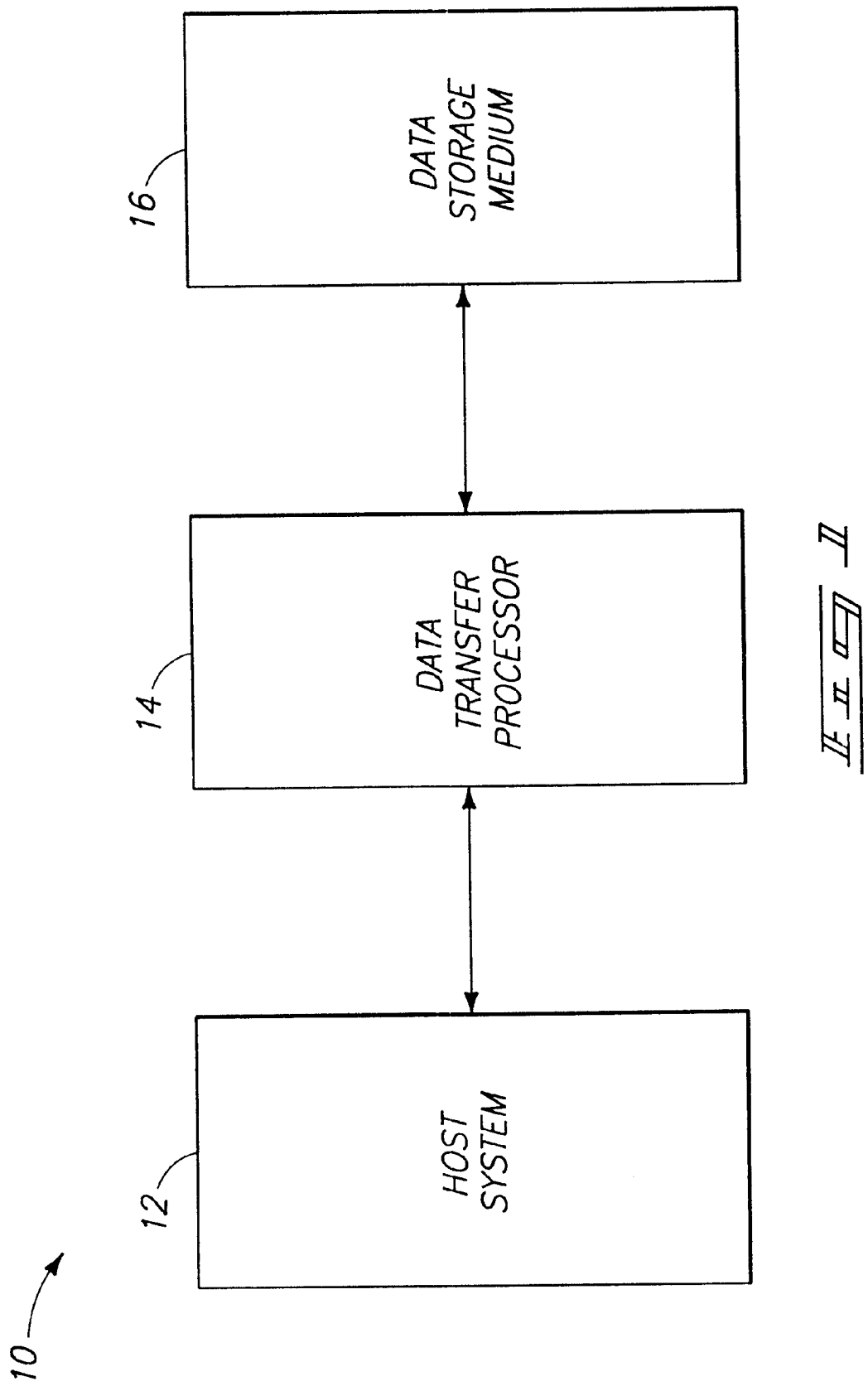
FIG. 1 is a simplified block diagram of a data processing system.
Figure 2:
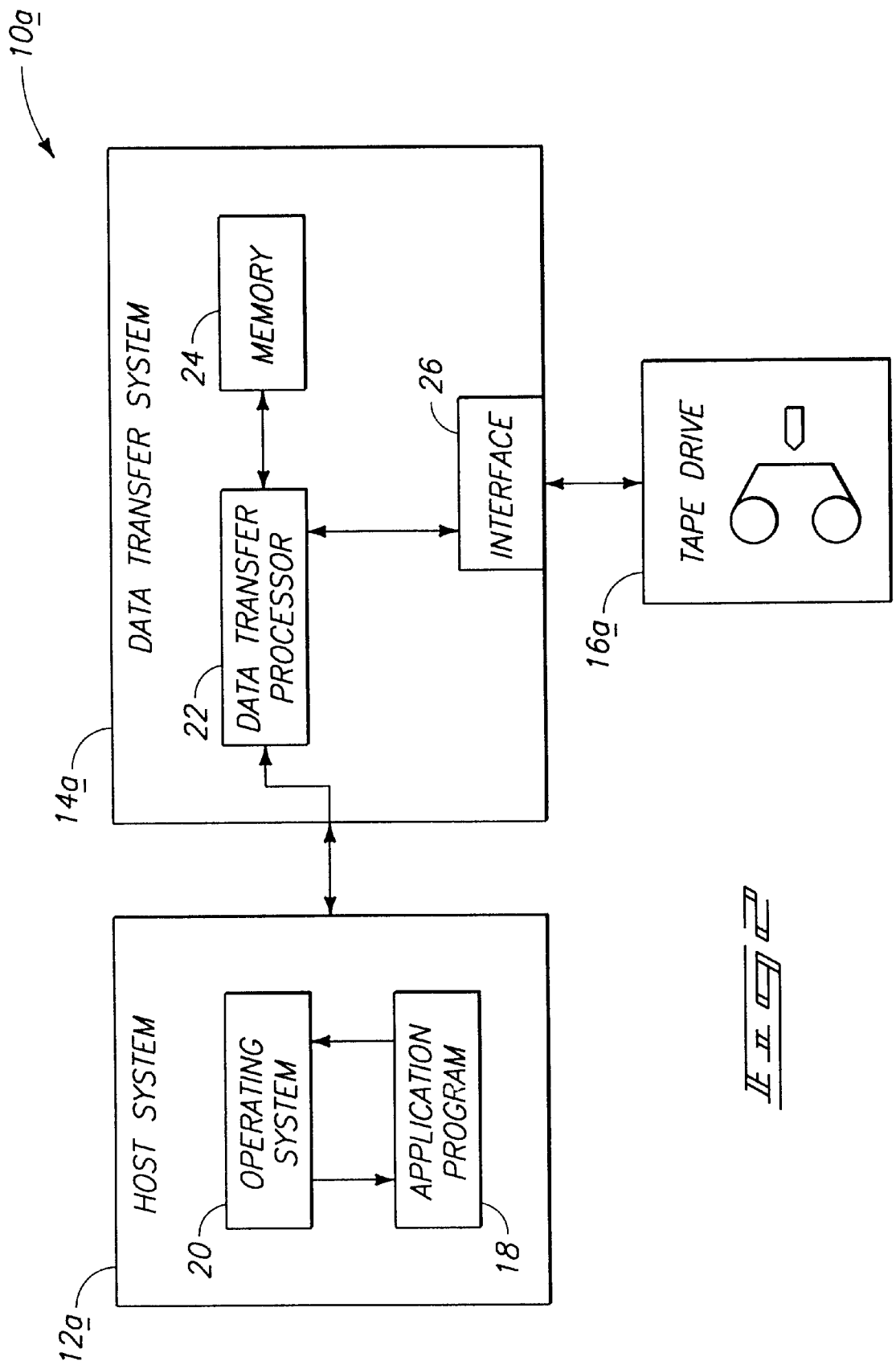
FIG. 2 is a block diagram of a data transfer system in accordance with one embodiment of the present invention.

Referring to FIG. 2, a system is shown generally at 10a, and is one which is configured to transfer data in accordance with one embodiment of the invention. Like numerals from the FIG. 1 embodiment have been utilized with differences being indicated by the suffix "a". A host system 12a is coupled to a data transfer system 14a for controlling a data storage medium, e.g. tape drive 16a, in accordance with principles of the invention. Host system 12a runs an application program 18 that reads and write data to and from tape drive 16a. An operating system 20 handles this communication by providing various services, such as making a collection of I/O commands available to the application program 18, management of the interrupt and DMA systems, and by providing a memory into which the data can be received. Data enters and leaves host system 12a through an I/O interface with data transfer system 14a. Tape commands and data are transmitted from host system 12a toward tape drive 16a, while data are transmitted in the direction from tape drive 16a toward host system 12a.

System 10a, and in particular data transfer system 14a can be configured for operation in connection with data organized in a variety of formats. For example, one such format is the Digital Data Storage (DDS) format described in the document "Digital Data Storage Format Description" (Revision B, October 1988) available from Hewlett-Packard Limited, Bristol, England. The DDS format is based on the DAT digital audio recording format but includes modifications and extensions to the basic DAT format to render it suitable for storing computer data. An extension to the DDS format is the DDS-DC format described in the document entitled "DDS-DC Format Specification No. DDS-06 Revision A dated January 1990", also available from Hewlett-Packard Ltd., Bristol, England. Such formats are described in more detail in U.S. Pat. No. 5,586,280 incorporated by reference above. The systems and methods to be described just below can provide added flexibility in their abilities to take on a "generic" appearance insofar as different host systems and data storage mediums are concerned.

Data transfer system 14a includes a data transfer processor 22, memory 24 which can be utilized as a temporary record-holding location or data buffer, and an interface 26 which operably couples data transfer system 14a with tape drive 16a. One aspect of the data transfer system is preferably configured for transferring data which is organized into a plurality of records from tape drive 16a to host system 12a. Data transfer system 14a is configured to handle records having variable lengths, without the need to provide as much overhead and complex processing as those systems which require, as part of the data transfer process, the individual lengths of each record to be stored and managed.

Data transfer system 14a or data transfer processor 22 can be implemented in any suitable hardware, software, firmware, or any combination thereof. In but one aspect, data transfer system 14a constitutes a so-called host interface module which is an Application Specific Integrated Circuit (ASIC). In addition, the data transfer system or processor can comprise either an integrated built-in component of an overall system, or it can be a system module which is configured to be utilized in connection with already existing data transfer systems. Flexibility is achieved, as will become apparent below, in the data transfer system's ability to handle individual records having individual lengths which are different, with reduced overhead and processing complexities.

Figure 3:
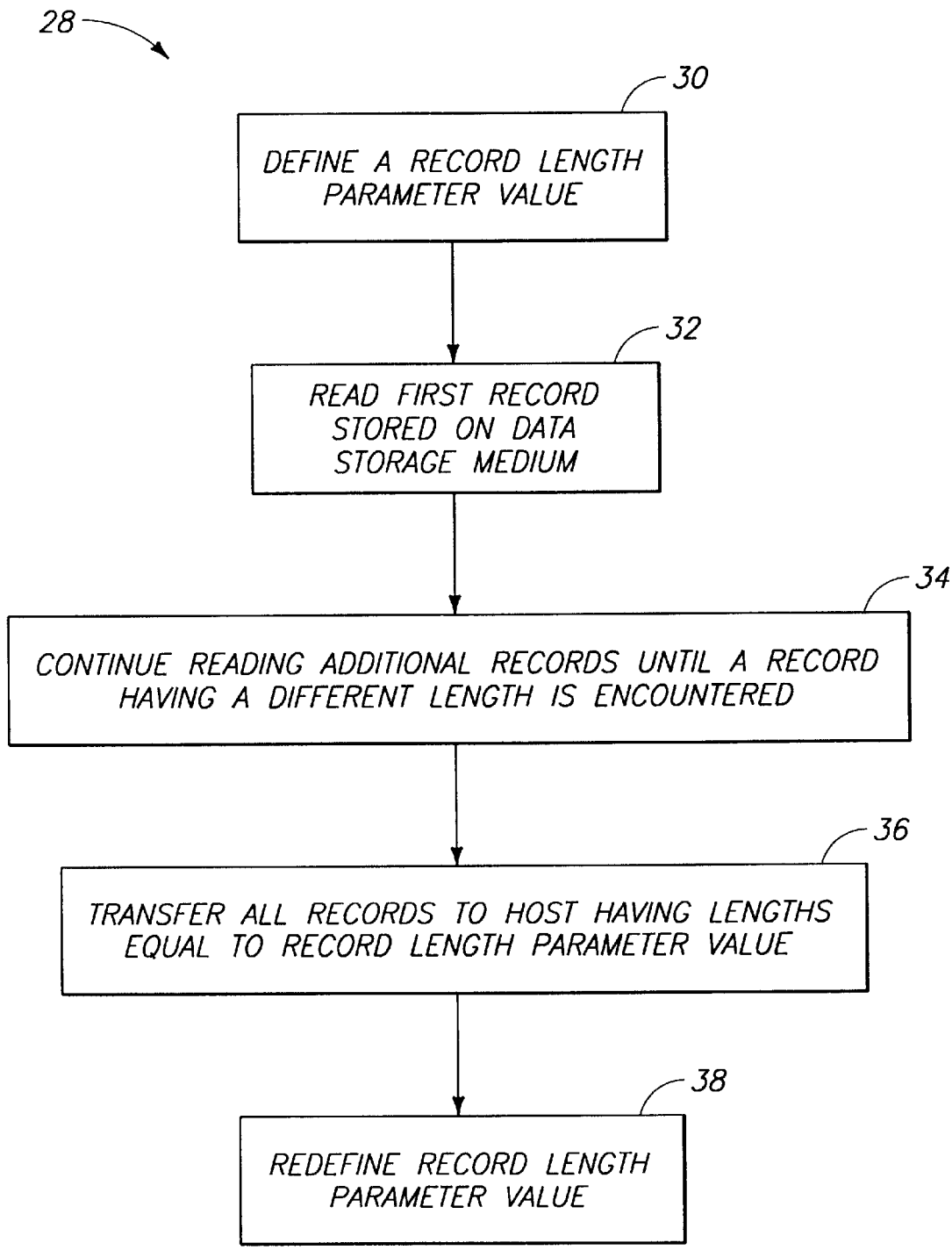
FIG. 3 is a flow diagram of a data transfer method in accordance with one embodiment of the invention.

Referring to FIG. 3, a flow diagram is set forth generally at 28 and constitutes a plurality of steps which can be accomplished by data transfer processor 22 (FIG. 2).

Figure 7:
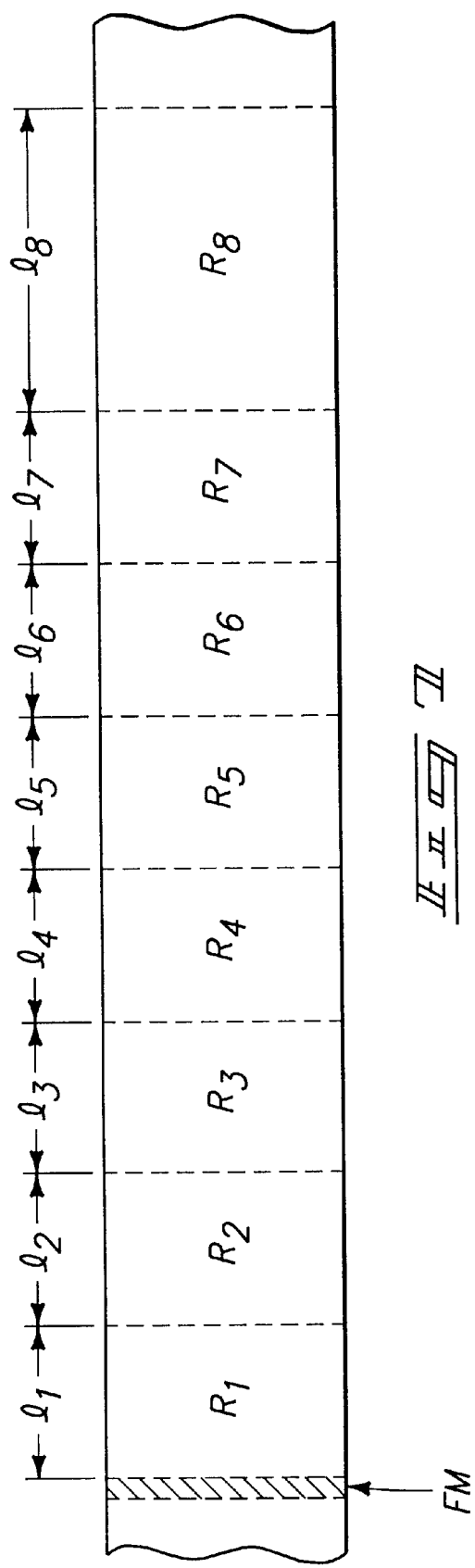
FIG. 7 is a diagram representing a sequence of data records stored on a data storage medium.

A record length parameter value is first defined at step 30, and describes a length of at least one record which is to be transferred from tape drive 16a (FIG. 2) to host system 12a. In a preferred embodiment, the record length parameter value is defined by reading a first record, at step 32, which is stored on tape drive 16a, and using its length as the record length parameter value. Tape drive 16a typically includes a plurality of individual records which are stored thereon, with some of the records having different lengths. As an example, FIG. 7 shows a tape portion having a plurality of records $R_1$–$R_8$ stored thereon. A file marker FM is shown proximate record $R_1$ and can mark the beginning of a file. Each record has an associated length $l_1$–$l_8$, which occupies a portion of the tape. Records $R_1$–$R_7$ have lengths $l_1$–$l_7$ which are the same. Record $R_8$, however, has a length $l_8$ which is different from lengths $l_1$–$l_7$. Accordingly, in this example when record $R_1$ is read, its length $l_1$ would be used as a first record length parameter value. Hence, the record length parameter value is not defined until a record is read from tape drive 16a by the data transfer processor 22. Preferably, the record is read into a temporary record-holding location or data buffer, such as memory 24 (FIG. 2), and reading of additional records continues, at step 34, until a record is encountered or read which has a length which is different from the first-defined record length parameter value. In the illustrated example in FIG. 7, such would constitute reading records $R_2$–$R_7$ until record $R_8$ is encountered or read into the data buffer. At this point, all of the records read from tape drive 16a into the temporary record-holding location 24 can be transferred to the host system at 36 before reading additional records. Transfer to the host system can also take place contemporaneously with the reading of the records from the tape drive into the temporary record-holding location. Accordingly, the reading and transferring functions can take place in a parallel manner. For example, one record can be read into the data buffer from the tape drive, and then transferred to the host system while another record is read into the data buffer. Preferably, all of the records which are transferred have lengths, e.g. $l_1$–$l_7$, which are equal to the record length parameter value, e.g. $l_1$, defined at step 30. It is to be understood that, in this example, the records are read in a serial fashion until a record is encountered or read having a different length. The records could, of course, be read in a fashion other than the serial fashion discussed above.

In accordance with a preferred embodiment, the record length parameter value which was first defined at step 30, is redefined at step 38 to comprise a length, e.g. $l_8$, which corresponds to the length of the record which was read or encountered which was different from the first-defined record length parameter value. Reading of additional records having lengths corresponding to the redefined record length parameter value can then continue until a record is read or encountered having a length which is different from the redefined record length parameter value. Accordingly, processing is similar to that described above with respect to transfer of the records. The continued reading of records takes place, in the preferred embodiment, after all of the records having the first-defined record length parameter value are transferred to the host system. Accordingly, prior to the transferring of such records, reading of records from tape drive 16a is discontinued.

Advantages of the method just described include a reduced overhead owing to the fact that individual lengths of records need not be individually stored, tracked, or otherwise maintained during a transfer process. Rather, a first record length parameter value is defined, and then used, until a record having a different length is encountered. Thus overhead and processing complexities can be significantly reduced.

In a preferred embodiment, and after the first record length parameter value definition step, only records having lengths corresponding to the first record length parameter value are transferred from the data storage medium to the host system. A second record length parameter value definition step defines a second record length parameter value which corresponds to the parameter value which is defined by the different-length record which is read and described above. A second transferring step can take place in which only records having lengths corresponding to the second record length parameter value are transferred from the data storage medium to the host system. Preferably, the records are transferred to a temporary record-holding location prior to ultimately being transferred to the host system.

Figure 4:
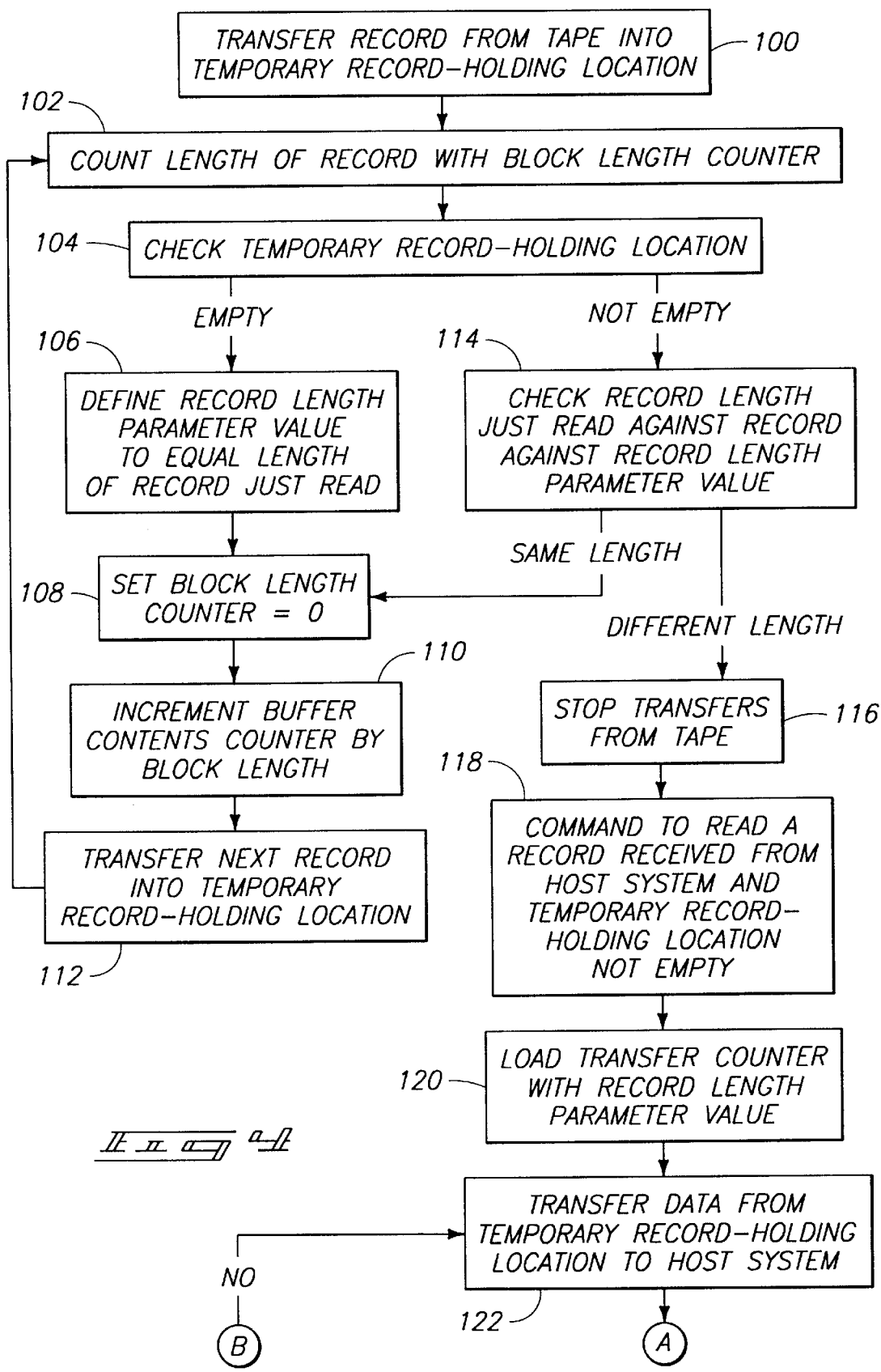
FIGS. 4 and 5 show a flow diagram of a data transfer method in accordance with one embodiment of the present invention.
Figure 5:
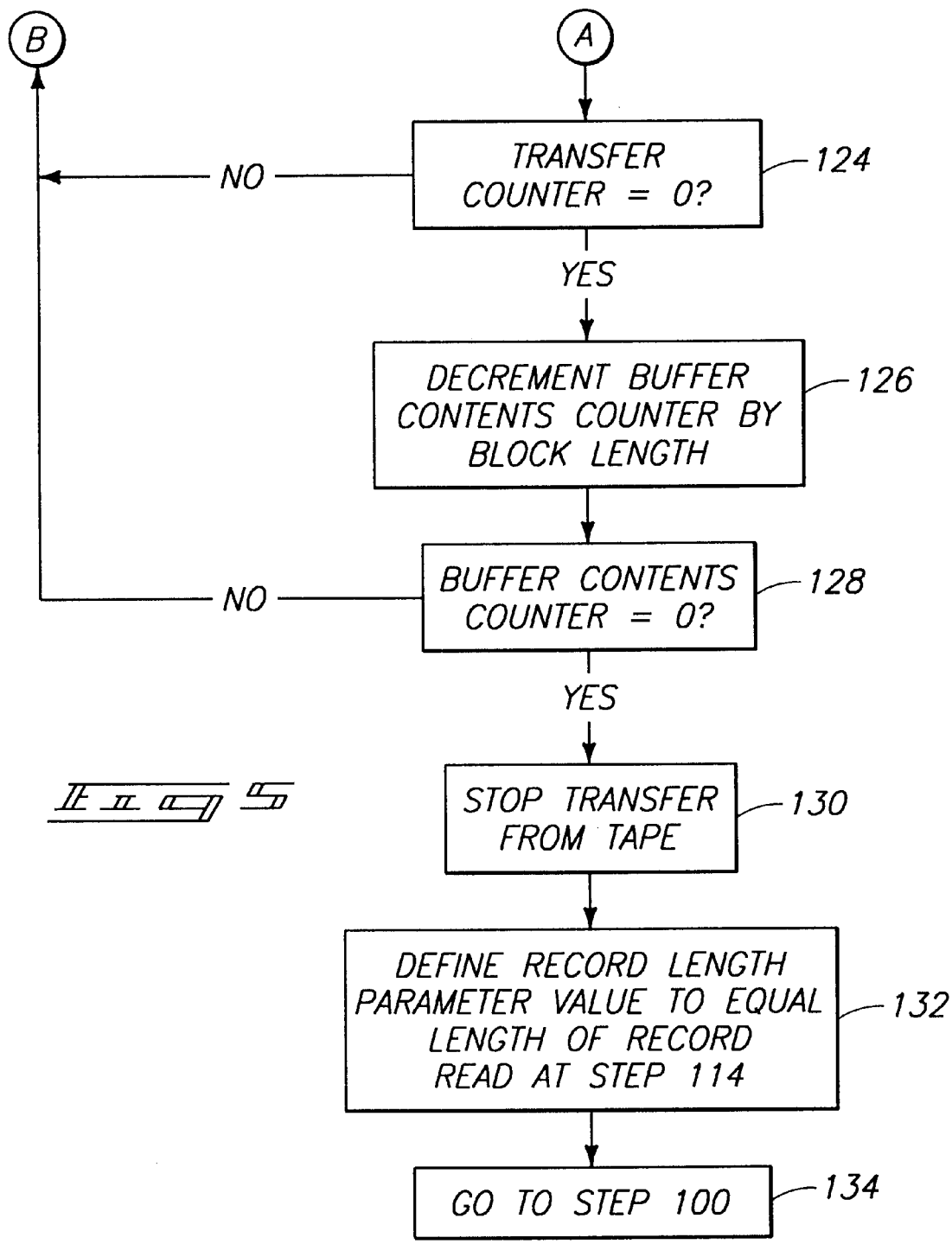
Figure 6:
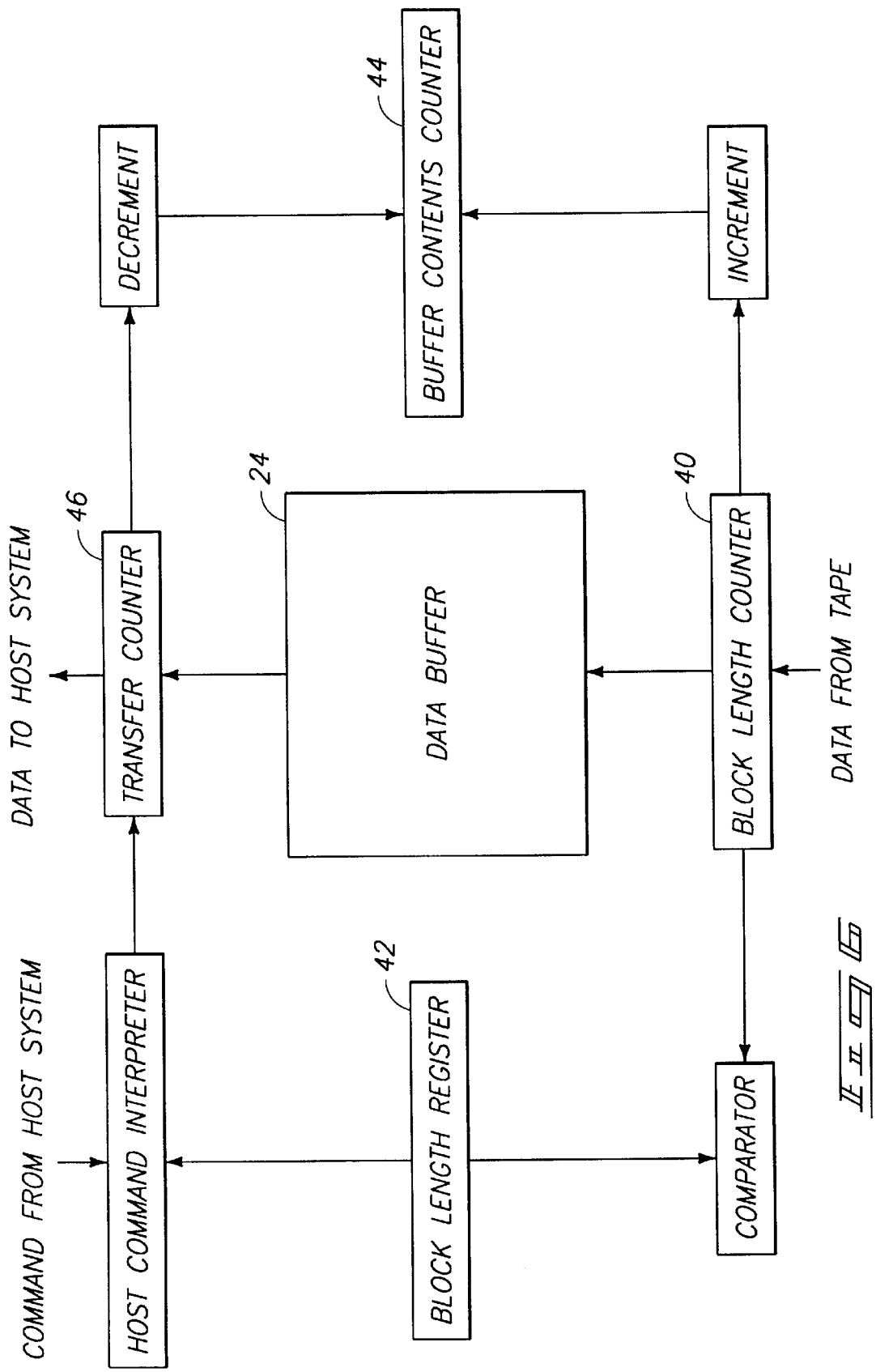
FIG. 6 is a of a data transfer system in accordance with one embodiment of the invention.

Referring to FIGS. 4–6, but one system is set forth in both flow diagram form (FIGS. 4 and 5), and in block diagram form (FIG. 6) which is configured to implement data transfer in connection with a tape drive system.

Before a specific explanation is given on such system, a few definitions are set forth. As used in the context of this document, a "block" will be understood to be synonymous with a "record". The "block length counter" is a register which holds the length of the last block transferred from the tape. The "block length register" holds the length of the blocks which are held in the data buffer or temporary record-holding location. The "buffer contents counter" represents the number of blocks which are held in the data buffer. The "transfer counter" represents the number of bytes to be transferred to the host system. The initial state for the block length counter, block length register, buffer contents counter, and transfer counter is zero.

Referring to FIGS. 4 and 5, a number of decision steps are set forth which can be accomplished by data transfer processor 22 (FIG. 2) in implementing this embodiment. At step 100, a record is transferred from tape drive 16a (FIG. 2) into temporary recording-holding location or data buffer 24. At step 102, data transfer processor 22 counts the length of the record with block length counter 40 (FIG. 6). At step 104, the data transfer processor checks to determine whether temporary record-holding location 24 is empty. Such can be done by checking to determine whether buffer contents counter 44 (FIG. 6) is zero. If buffer contents counter 44 is zero, which corresponds to the record-holding location 24 being empty, then at step 106, a first record length parameter value is defined to equal the length of the record just read from the tape drive. Accordingly, block length register 42 (FIG. 6) is loaded with the value in block length counter 40. At step 108, block length counter 40 is then set to zero, buffer contents counter 44 is incremented at step 110 by the block length, and at step 112, the next record is transferred into temporary record-holding location 24. When the next record is transferred into the record-holding location, steps 102 and 104 are repeated.

At step 104, if buffer contents counter 44 is not zero, which indicates the presence of a block or record in the temporary record-holding location 24, a check or comparison is conducted, at step 114, to determine whether the length of the record just read is the same as, or different from, the record length parameter value which was originally defined. If the values are the same, the "same length" branch from step 114 sets block length counter 40 to zero (step 108), increments buffer contents counter 44 by the block length (step 110), and transfers the next record into temporary record-holding location 24 (step 112).

If, on the other hand, at step 114 the record lengths differ, transfers from the tape can be stopped at 116. At step 118, when a command to read a record is received from host system 12a (FIG. 2), and if the temporary record-holding location is not empty (i.e. buffer contents counter 44 is not zero), then transfer counter 46 is loaded, at step 120, with the value in block length register 42, i.e. the record length parameter value, and data is transferred, at step 122, from temporary record-holding location 24 to host system 12a (FIG. 2).

Referring to FIG. 5 (which is a continuation of the FIG. 4 flow diagram), transfer counter 46 is checked, at step 124, to determine whether it is zero. If transfer counter 46 is not zero, then transfer of data continues at step 122. If transfer counter 46 is zero, buffer contents counter 44 is decremented by a block length, at step 126, and a check is conducted, at step 128, to determine whether buffer contents counter 44 is zero, i.e. no more blocks left to transfer. If buffer contents counter 44 is not zero, i.e. all of the data in data buffer 24 has not been transferred, transfer is continued at step 122. If, however, buffer contents counter 44 is zero, the system waits until it is incremented. If buffer contents counter 44 reaches zero, and the transfer from the tape drive has been stopped (step 130), then, at step 132, block length register 42 is loaded with block length counter 40, which redefines the record length parameter value to equal the length of the record which was read at step 114, i.e. the different length record.

Processing can then continue at step 134 by returning to step 100. Doing so requires block length counter 40 to be set to zero and buffer contents counter 44 incremented with the transfer of data being restarted. The above described system and method constitutes but one implementation of the invention. Other implementations, such as those which contemporaneously read records from the tape drive and transfer them to the host systems are possible.

Advantages of the present methods and systems can include that the overhead required for the management of data transfer between a data storage medium, such as a tape drive, and a host system, as well as the processing complexities attendant therewith are significantly reduced. Additionally, the methods and systems are capable of implementation with a wide variety of data in connection with a number of different formats. Other advantages include a reduction in the number of registers, e.g. only two, which can be utilized to maintain all of the data in the temporary memory location. Accordingly, simplified hardware structures and software solutions are possible. Other aspects of the invention allow automation of the detection of different lengths which do not match what the host requires. The systems and methods can be modified by adding additional registers to hold record or block lengths or the addition of records to give the number of records of those lengths. Such facilitates optimization of the systems and methods for environments where blocks or records are not usually of the same length, but do follow a pattern.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data transfer method for transferring data organized into a plurality of records from a readable data storage medium to a host system comprising:

defining a record length parameter value which describes a length of at least one record which is to be transferred from a readable data storage medium to a host system;

reading a first record stored on said readable data storage medium and having a length which corresponds to said record length parameter value into a record holding location and continuing reading additional records into said record holding location until a record is read which has a length which is different from the defined record length parameter value; and transferring all of the records read from the readable data storage medium into the record holding location and having lengths corresponding to the presently-defined record length parameter value to the host system.

2. The data transfer method of claim 1, wherein the defining of the first record length parameter value comprises using the length of the first record read as the first record length parameter value.

3. The data transfer method of claim 1 further comprising redefining the record length parameter value to comprise a length corresponding to said different record length, and wherein said reading comprises continuing reading records having lengths corresponding to said redefined record length parameter value until a record is read that has a length which is different from said redefined record length parameter value.

4. The data transfer method of claim 3, wherein said continuing reading of said records having lengths corresponding to said redefined record length parameter value takes place after said transferring of said records.

5. The data transfer method of claim 1 further comprising prior to said transferring, discontinuing said reading.

6. A data transfer method for transferring data organized into a plurality of records from a readable data storage medium to a host system comprising:

providing a readable data storage medium having a plurality of records stored thereon, some of the records having lengths which are different from other of the records;

first defining a first record length parameter value;

first transferring only records having lengths corresponding to the first record length parameter value from the data storage medium to the host system;

second defining a second record length parameter value which is different from the first record length parameter value; and second transferring only records having lengths corresponding to the second record length parameter value from the data storage medium to the host system.

7. The data transfer method of claim 6, wherein said first defining comprises reading a first record stored on said readable data storage medium and using said first record's length as the first record length parameter value.

8. The data transfer method of claim 6 further comprising:

prior to said first transferring said records to said host system, reading records which are stored on said readable data storage medium and having individual lengths which correspond to said first record length parameter value into a temporary record-holding location until a record is encountered having a length which is different from said first record length parameter value; and after encountering said record having said different length, transferring the records having lengths corresponding to said first record length parameter value from said temporary record-holding location to said host system.

9. The data transfer method of claim 6, wherein:

said first defining comprises reading a first record stored on said readable data storage medium and using said first record's length as the first record length parameter value, and further comprising:

prior to said first transferring said records to said host system, reading records which are stored on said readable data storage medium and having individual lengths which correspond to said first record length parameter value into a temporary record-holding location until a record is encountered having a length which is different from said first record length parameter value; and after encountering said record having said different length, transferring the records having lengths corresponding to said first record length parameter value from said temporary record-holding location to said host system.

10. The data transfer method of claim 9 further comprising reading said record having said different length into said temporary record-holding location prior to said first transferring.

11. The data transfer method of claim 9, wherein said second defining comprises using the length of said record having said different length as said second record length parameter value.

12. The data transfer method of claim 11 further comprising prior to said second transferring said records to said host system, reading records which are stored on said readable data storage medium and having individual lengths which correspond to said second record length parameter value into said temporary record-holding location until a record is encountered having a length which is different from said second record length parameter value; and after encountering said record having a length which is different from said second record length parameter value, transferring the records having lengths corresponding to said second record length parameter value from said temporary record-holding location to said host system.

13. A data transfer system for transferring data organized into a plurality of records from a readable data storage medium to a host system, the data transfer system comprising a data transfer processor operably configured for coupling between a host system and a readable data storage medium having stored thereon a plurality of records, individual records having individual lengths at least some of which being different, the data transfer processor being configured to:

first define a record length parameter value;

conduct a first retrieval of records from the data storage medium and transfer to the host system only records having lengths which correspond to said record length parameter value;

second define said record length parameter value to have a value which is different from the first-defined record length value; and conduct a second retrieval of records from the data storage medium and transfer to the host system only records having lengths which correspond to said second-defined record length parameter value.

14. The data transfer system of claim 13, wherein said data transfer processor is further configured to place records which are retrieved from said data storage medium into a temporary record-holding location prior to transferring said records to said host system.

15. The data transfer system of claim 13, wherein said processor is configured to first define said record length parameter value by reading a first record which is stored on said readable data storage medium and using said record's length as said record length parameter value.

16. The data transfer system of claim 15, wherein said data transfer processor is further configured to place records which are retrieved from said data storage medium into a temporary record-holding location prior to transferring said records to said host system.

17. The data transfer system of claim 13, wherein said processor is configured to:

first define said record length parameter value by reading a first record which is stored on said readable data storage medium and using said record's length as said record length parameter value; and second define said record length parameter value by reading a record which is different from the first record and which has a length which is different from the length of said first record, and using said different record's different length as said record length parameter value.

18. The data transfer system of claim 13, wherein said processor is configured to:

store said first defined record length parameter value;

check each first retrieved record's length against the first defined record length parameter value and, if the length of an individual first retrieved record is the same as the first defined record length parameter value, then retrieve another record, else stop said first retrieval and effect said transfer of said first retrieved records having lengths which are the same as the first defined record length parameter value to said host system.

19. The data transfer system of claim 18, wherein said processor is configured to place said first retrieved records into a temporary record-holding location prior to transferring said records to said host system.

20. The data transfer system of claim 18, wherein said processor is configured to store the length of the first record retrieved from the data storage medium as the record length parameter value.

* * * * *